H. STRICKLIN.
HAND GUARD FOR CULINARY IMPLEMENTS.
APPLICATION FILED SEPT. 5, 1919.
1,330,406.
Patented Feb. 10, 1920.
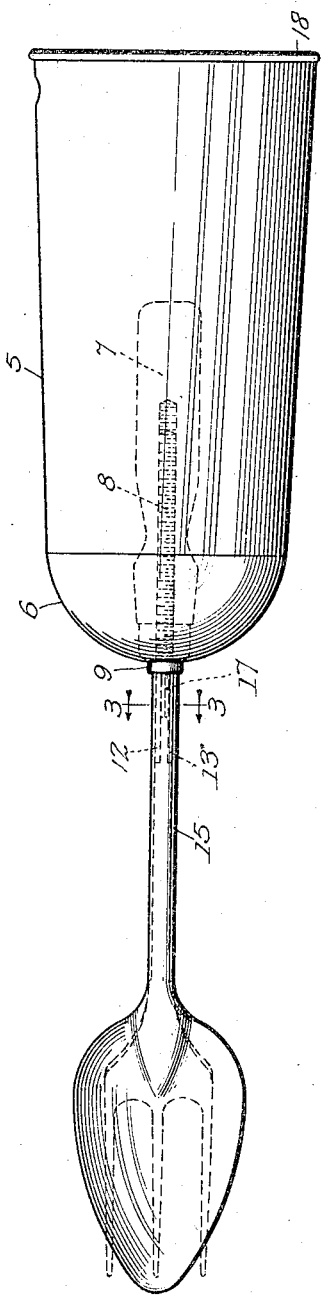
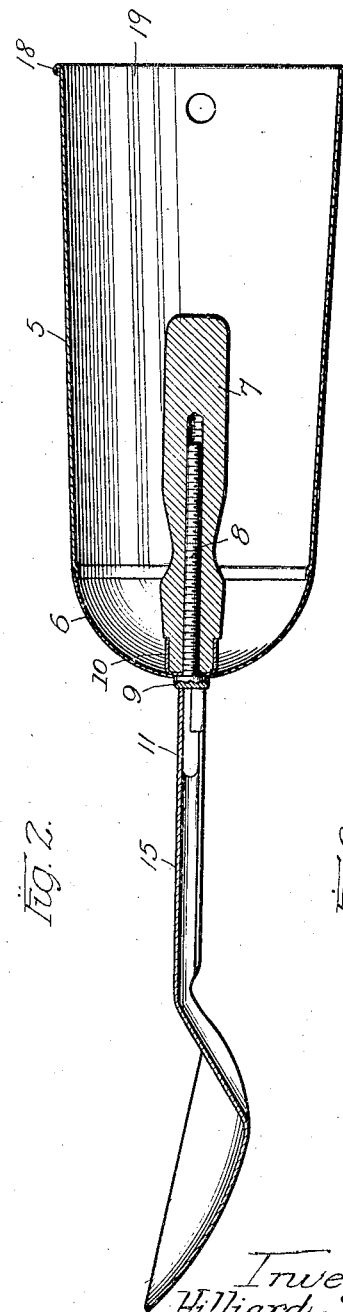
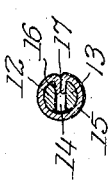
Inventor
Hilliard Stricklin
Jonee Bain & Hinkle
Attys.

UNITED STATES PATENT OFFICE.

HILLIARD STRICKLIN, OF CHICAGO, ILLINOIS.

HAND-GUARD FOR CULINARY IMPLEMENTS.

1,330,406.    Specification of Letters Patent.    Patented Feb. 10, 1920.

Application filed September 5, 1919. Serial No. 321,856.

*To all whom it may concern:*

Be it known that I, HILLIARD STRICKLIN, a citizen of the United States, residing at Chicago, in the county of Cook and State of Illinois, have invented certain new and useful Improvements in Hand-Guards for Culinary Implements, of which the following is a specification.

My invention relates to hand guards for culinary implements.

One of the objects of the invention is to provide a rigid metal cylindrical hand guard for culinary implements, such for example as forks, basting spoons, and the like, to protect the hand of the cook from flying grease, intense heat, and steam or vapor arising from the cooking food.

Another object is to provide a strong, cheaply constructed and easily operated means for attaching the implements to the guard.

Another object it to provide improved means for attaching the handle, within the guard, to the guard.

Other, further and more specific objects of my invention will become readily apparent to persons skilled in the art from a consideration of the following description when taken in conjunction with the drawings, wherein:—

Figure 1 shows the device in elevation.

Fig. 2 is a longitudinal central section.

Fig. 3 is a section taken on line 3—3 of Fig. 1.

In all the views the same reference characters are employed to indicate similar parts.

In the single embodiment which has been chosen to illustrate the invention, 5 is a tapered cylindrical guard portion, made preferably of aluminum, or other similar metal, within which to contain the hand of the cook or operator, closed at one end by a globe like cap 6. Within the cylinder 5 is a handle 7 secured in place by a screw threaded stem or shank 8 which is provided near its outer end with a collar 9 so that the handle tightens the head 6 between the collar and its ferrule 10. Projecting outwardly from the part 6 is a two pronged attaching means 11 comprising two spaced apart prongs 12 and 13 with a space 14 therebetween. A spoon, fork or the like, 15, has a hollow shank with its edges inturned, as at 16, and 17, to be included within the space 14 between the prongs 12 and 13, for attaching the implement to the guard. The resiliency of the shank 15 is sufficient to cause the implement to be retained on the attaching means 11 by the friction exerted between the parts while the prongs 12 and 13 extend sufficiently within the shank 15 of the implement to afford a strong joint between the two instruments.

A cake turner or knife, or other implement of similar character may be fashioned to fit upon the attaching means 11 in the same manner as the fork and spoon, shown in the drawings, are attached.

In the use of the instrument the operator grasps the handle 11 while the shield 5 encompasses and protects his hand from any disagreeable influences attendant upon cooking. The implement attached to the guard or shield can be handled as readily and dextrously with the guard present as if it were not in place.

I prefer to turn a bead 18 around the open end 19 of the guard, to provide thereby a smooth edge free of abrading surfaces, and a hole 20 may be made through the wall of the cylindrical guard, by means of which the guard may be hung upon a nail when not in use.

While I have herein shown and described an embodiment of my invention for the purpose of clear disclosure it will be manifest, to persons skilled in the art, that changes may be made in the configuration and general disposition of the parts within the scope of the appended claims.

Having described my invention, what I claim is:—

1. A hand guard for culinary implements having in combinative association a tapered cylindrical housing with a rounded closed end; a threaded shank, having a collar on its outer end, projecting into said cylinder, said shank longitudinally divided on its outer end to provide two prongs for fastening means, and a handle, within the cylinder, threaded on said shank.

2. A hand guard for culinary implements having in combinative association a cylindrical, rigid housing open at one end and closed at the other end by a hemispherical cap; a shank extending through said cap into the cylinder, threaded on its inner end; a collar on the outer end of the shank for contact with the cap; a handle within said housing, threaded on said shank for securing the housing between the collar and shank; fastening means for implements provided by longitudinally dividing the outer end of the shank into two spaced apart prongs and an implement having a split hollow shank, with its edges inturned to provide a coöperating fastening means in which the inturned edges are adapted to be received within the space between the prongs projecting from said guard.

In testimony whereof I hereunto subscribed my name.

HILLIARD STRICKLIN.